April 1, 1969 R. J. COWLES 3,435,496
METHOD OF MANUFACTURING CYLINDRICAL CERAMIC CAPACITORS
Original Filed Oct. 11, 1963
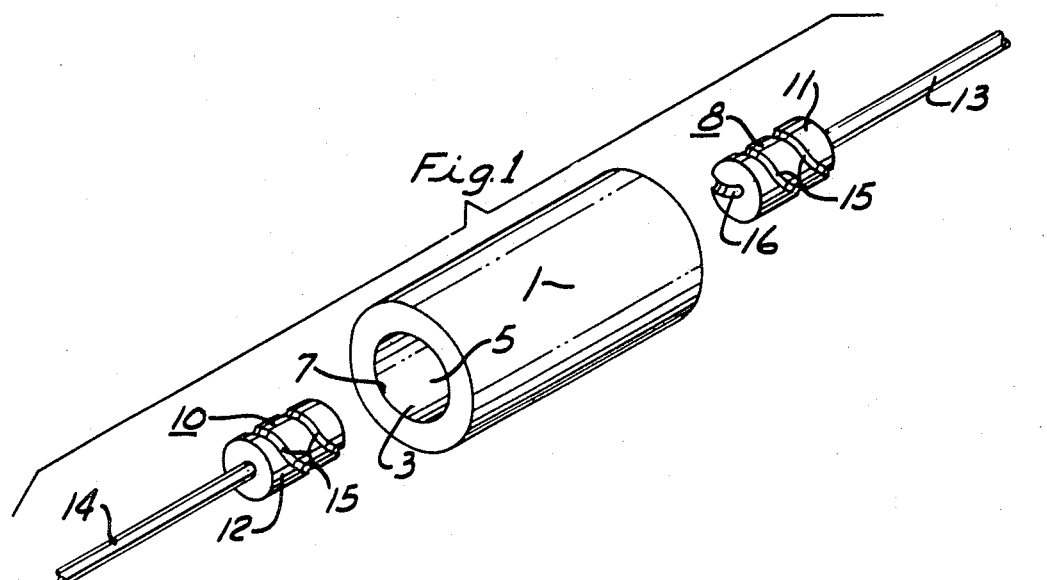
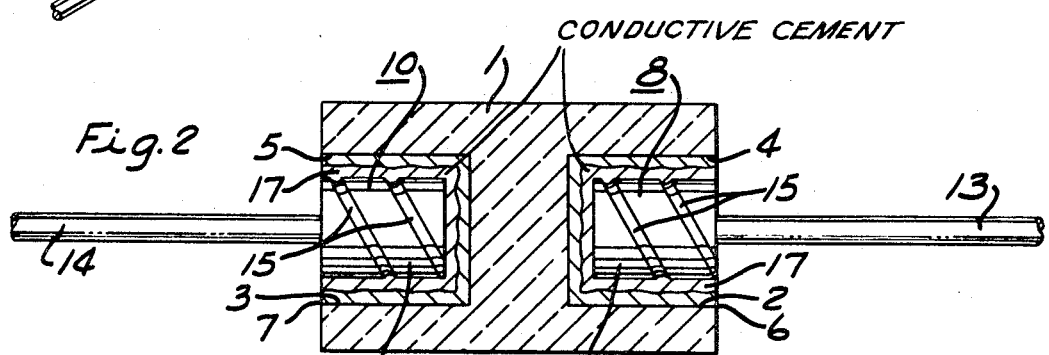
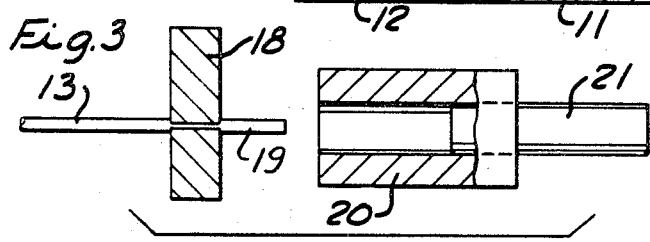
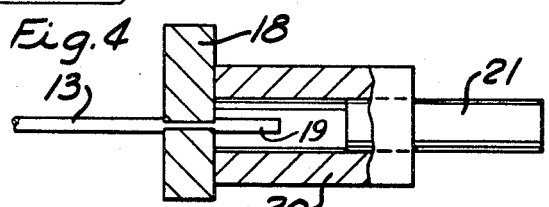
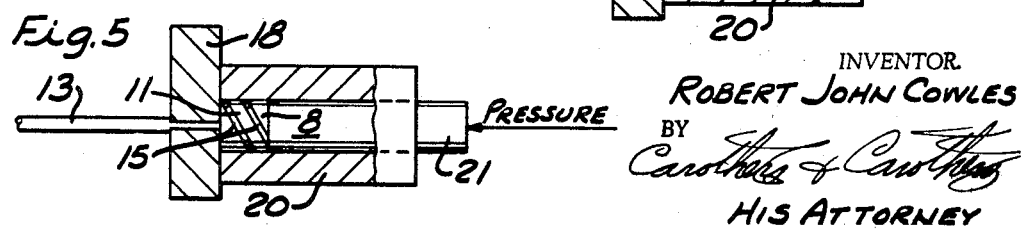
INVENTOR.
ROBERT JOHN COWLES
BY
HIS ATTORNEY United States Patent Office 3,435,496
Patented Apr. 1, 1969

3,435,496
METHOD OF MANUFACTURING CYLINDRICAL CERAMIC CAPACITORS
Robert John Cowles, Ridgeway, Pa., assignor to Quality Components, Incorporated, St. Marys, Pa., a corporation of Pennsylvania
Original application Oct. 11, 1963, Ser. No. 315,602, now Patent No. 3,256,471, dated June 14, 1966. Divided and this application Jan. 4, 1966, Ser. No. 518,715
Int. Cl. H01g 13/00
U.S. Cl. 29—25.42          1 Claim

ABSTRACT OF THE DISCLOSURE

The method of manufacturing cylindrical ceramic capacitors wherein a mixture of ceramic powder granules with a temporary binder are molded to form a cylindrical ceramic body having axial aligned recesses in each end thereof. The ceramic molded body is then baked to vitrify the same. Electrodes are formed on the surfaces of the recesses by coating each of the recesses with a silver paste and then the ceramic molded body with the molded electrodes is again baked to fuse the coated electrodes to the ceramic molded body. A special solid cylindrical terminal head is formed having a spiral groove along the terminal head perimetral surface by upsetting, under compression, one end of a terminal wire. The terminal head is cemented to the electrode in each of the recesses by applying a thermosetting conductive cement to the terminal head and curing the cement in situ by baking the assembled cylindrical ceramic capacitors to form a bond to each electrode and its respective terminal head.

---

This application is a division of patent application Ser. No. 315,602 filed Oct. 11, 1963 now Patent No. 3,256,471 issued on June 14, 1966.

This invention relates generally to the method of manufacturing ceramic capacitors and more particularly to the method of manufacturing cylindrical ceramic capacitors of the axial lead type.

The principal object of this invention is an improved method of manufacturing and producing tubular type ceramic capacitors possessing highly desirable characteristics which is simple in construction and, thus, economical to manufacture.

In the method of manufacturing the cylindrical ceramic capacitors illustrating the features of this invention, ceramic powders include metallic oxides in various proportions and are molded into the desired ceramic body which is baked at a predetermined temperature in order to hold the blended materials in a vitrified homogeneous mass. The ceramic body, as molded and baked, has cylindrical recesses in the ends thereof within which silver electrodes are flashed through the process of baking at a predetermined temperature. After the flashing of the silver electrodes in each of the recesses of the ceramic body, the terminal head of each of of the terminals is cemented into the coated electrode recess and subsequently the ceramic capacitor, as assembled, is cured in order that the terminal head is bonded securely to the silver electrodes.

Thus, the method comprising this invention involves the steps of first, baking the cylindrical molded ceramic body which has a cylindrical recess in its ends, in order that the body will be vitrified; second, flashing silver electrodes in each of the recesses; third, cementing a terminal head to each electrode in each of the recesses of the ceramic body; and fourth, curing the cemented assembly.

The improved method of this invention is a capacitor which is much more durable and mechanically rugged as compared to the thin walled tubular disc type capacitors.

The use of solid type terminal heads reduces electrode inductance which makes this highly desirable for operation and also prevents burn spots and holes and functions as a heat sink when the capacitors comprising this invention are soldered into an electrical circuit.

Thermosetting cement is used to cement the terminal head to the coated electrode recess within the ceramic body of the capacitor. Such a cement may be epoxy conductive cement which not only has good affinity to metal but also good affinity to other metals which are not solderable, but possess desirable characteristics. The use of this type of cement also eliminates displacement of the terminal head in the coated electrode recesses due to intense heat during the soldering operation of circuit assembly or during circuit operation. Thermosetting conductive cement eliminates the possibility of dissolving the silver electrode material as might result if solder were used in place of this cement. Furthermore, this type of cement possess high strength upon curing and can be made with proper viscosity without use of a solvent thereby eliminating blistering and produce a by-product upon curing which may reduce the good electrical characteristics of the capacitor.

The terminals are provided with terminal heads which have spiral grooves or indentations which aid in obtaining good adhesion upon cementing the terminal head in the coated electrode recesses.

The method of manufacture comprising this invention provides a cylindrical construction for a ceramic capacitor which reduces a voltage stress at the edges of the electrodes. The concentration of electrical stress is at the edges of the electrodes because the edges of the electrodes are not in cross relationship to each other as found in the structures of the conventional disc type capacitors. Since the electrode edges at the inside edge of each of the recesses have a large dielectric separation from each other, there is less chance that dielectric breakdown will occur in a capacitor manufactured under the method of this invention.

Another advantage of the method of manufacturing of this invention is that the coated electrode recesses are self-insulated from the atmosphere and, thus, other electrical circuit components. There is, therefore, no need for exterior insulation and, furthermore, the disadvantage of dirt and moisture penetration, which degrades the electrical properties of the capacitor, are eliminated.

The method of manufacturing of a ceramic capacitor comprising this invention provides a dielectric body construction having a longer surface leakage path between the electrodes of the capacitor as compared with electrical discs and tubular capacitors and, thus, further reduces the chance of dielectric breakdown wherein the surfaces of the capacitors are subjected to the presence of moisture, dirt or other foreign matter collecting thereon, reducing the capacitors dielectric strength through the formation of a conductive path between the electrodes.

Other objects and advantages appear hereinafter in the following description and claims.

The accompanying drawings show for the purpose of exemplification without limiting the invention or the claims thereto certain practical embodiments illustrating the principles of this invention wherein:

FIG. 1 shows an exploded and enlarged view of the capacitor comprising this invention.

FIG. 2 shows an enlarged axial cross-sectional view of the capacitor comprising this invention.

FIG. 3 shows the apparatus for producing terminal heads used with the capacitor comprising this invention.

FIG. 4 shows the apparatus for producing terminal heads before the pressure forming operation.

FIG. 5 shows the apparatus for producing terminal heads after the pressure forming operation.

Referring now to the figures the cylindrical dielectric cylindrical body 1 is a ceramic material. At the ends of this cylindrical body 1 there is formed the recesses 2 and 3. The principal purposes of the ceramic body as far as capacitor construction is concerned is to insulate the two electrodes 4 and 5 of the capacitor from one another and also insulate them from other circuit components and support them in capacitive relation to each other. Furthermore, due to the construction of this ceramic body 1 the electrodes are protected from atmospheric elements such as moisture, dust and any other foreign material which could affect the electrical properties possessed by the electrodes 4 and 5.

The cylindrical dielectric body 1 is made first by blending together the required ceramic powder including metallic oxides in various proportions depending on the required capacitance to be obtained, the temperature coefficient of capacity required, and the Q value desired after the ceramic body has been baked. A temporary binder such as phenolic resin or wax emulsion in water is added to the mixture of ceramic powders in order to temporarily hold the blended elements in a homogeneous mass until the baking operation is completed. The temporary binder will burn out completely during the baking operation and, therefore, is used only to maintain the form of the ceramic body in its required shape prior to the high fusion temperatures used in the baking operation.

The ceramic powders used in this blend can be such metallic oxides such as barium titanium oxides ($BaTiO_3$) and titanium oxide ($TiO_2$).

After the binder is thoroughly mixed in the ceramic powders, the mixture is then dried and granulated to the proper mesh for the molding operation. The ceramic powder granules are then placed in a cylindrical steel mold. The steel mold has end punches which have a projection on their face for forming the body and the recesses in the ends of the ceramic body 1. The end punches are inserted in each end of the mold, and pressure is applied resulting in the formed ceramic body 1. The ceramic body 1 is then ejected from the mold and is ready for the baking operation.

The baking operation may be carried out in an electrically heated furnace having an oxidizing atmosphere at temperatures between 2100° F. and 2500° F. However, it should be realized that the time and temperature of this baking operation is dependent upon the size and shape of the particular ceramic body being processed. After the baking operation the ceramic body 1 possesses a vitreous quality and posseses great mechanical strength.

The electrodes 4 and 5 are then formed inside the recesses of the ceramic body. The electrodes 4 and 5 are coated upon the bottom and the cylindrical side walls up to the inside edges 6 and 7 of the recesses 2 and 3 respectively. The preferred electrode material is silver because of its excellent conductivity ability and also because of the higher Q-value obtainable in the capacitor. Furthermore, silver makes more intimate contact with the ceramic dielectric.

The silver electrodes are made by coating these surfaces 2 and 3 with a commercial silver paste which consists of pure silver powder, glass frit, and temporary organic binders. After coating, the parts are baked at a low temperature to expel any volatile thinners which may blister the electrodes reducing their intimate bond with the ceramic dielectric upon heating the ceramic body to a higher temperature. After this baking by heating at lower temperature, the ceramic body 1 with the silver coated electrodes is then placed in an oven at a temperature of about 1200° F. for approximately twenty minutes. The silver glas frit blend melts and adheres to the ceramic surface of the recesses 2 and 3 thus forming conductive metallic electrodes 4 and 5 firmly bonded to the ceramic.

The terminals 8 and 10 consists of substantially solid cylindrical terminal heads 11 and 12 and stems 13 and 14 which protrude from the center of one end of the terminal heads 11 and 12 respectively. Spiral or circumferential grooves or indentations 15 are formed during the coiling process on the perimetral surface of the cylindrical heads 11 and 12 which spiral toward the ends of the terminal head. The spiral groove or indentation 15 terminates at 16 in the center of the head. The terminal heads 11 and 12 may be formed from a single copper wire. One end of this copper wire is upset in a cavity which forms the coiled terminal head. Thus the wire stems 13 and 14 are integral with the terminal heads 11 and 12 respectively. The terminal connections 8 and 10 may then be tin coated for good solderability when the finished capacitor is asembled in a circuit.

FIGS. 3, 4 and 5 show the manner in which the terminal heads 11 and 12 are formed. A copper wire such as the stem 13 is placed in the clamp 18 with a sufficient amount of its length projecting as shown at 19 to form a terminal head by compression coiling. An open cylinder die 20 is provided with a piston 21 at one end. As shown in FIG. 4 the open end of the cylinder 20 is placed over the end 19 of the wire 13 and in contact with the smooth and flat face of the clamp 18. The cylinder 20 and the clamp 18 are held in fixed relationship to each other with suitable clamp means. Pressure is then applied to the piston 21, and as shown in FIG. 5, the piston causes the wire to coil. The spiral grooves 15 are merely the gaps or grooves formed between adjacent wire turns when coiled or pressed into a head. Coiling and upsetting the wire 13 produces the spiral groove 15.

The terminal heads 11 and 12 are secured within the recesses 2 and 3 to the silver electrodes 4 and 5 by using a thermosetting conductive cement 17 such as epoxy conductive cement. Such a cement is used in the construction of this type of capacitor because epoxy resin used in this cement possesses high strength upon curing which is needed for good mechanical axial terminal anchorage. Furthermore, epoxy cement has great affinity for metal as well as non-metallic materials which also may be good electrode materials such as colloidal graphite or air dry metallic conductive coatings. Such electrode materials are not solderable which is not a necessary requirement when epoxy cement is employed.

Epoxy cement is thermosetting and is available in the proper viscosity without the use of any solvent which otherwise might cause blistering if the solvent is not completely removed before the curing process. Also other types of cement may produce other unwanted by-products in the curing process and thereby reduce the good electrical characteristics of the capacitor. Silver powder is used as a filler in the thermosetting cement not only because of its high conductivity but also because of the resultant high Q-value in the capacitor. Furthermore, silver has the good characteristic of resisting oxidation during the curing process and is compatible with the resin.

Epoxy conductive cement makes a very mechanically strong connection between the terminal heads 11 and 12 and the electrodes 4 and 5 in the recesses 2 and 3 and because of the resistance of epoxy resin to high temperatures such as temperatures up to 700° F., without loss of mechanically axial support, strength and adhesion with the terminals 4 and 5 in the recesses 2 and 3. If solder is used in place of thermosetting cement, the conducting of heat through the stems 13 and 14 and heads 11 and 12 during circuit operation may cause the terminal connections 8 and 10 to move out of position due to the melting or weakening of the solder. This is avoided by using thermosetting cement. Furthermore, by using thermosetting conductive cement, there is no possibility of dissolving or otherwise disintegrating the silver electrode material as might frequently occur if solder were used and where special precautions would have to be taken. Thus the electrodes 4 and 5 may be made of a thinner silver coating than is normally used being more practical and consequently lower cost in manufacturing these capacitors.

The epoxy conductive cement used is a product which consists of silver powder, epoxy resin and a catalyst. The terminal heads 11 and 12 are coated with this epoxy conductive cement 17 and then are placed in the recesses 2 and 3 of the ceramic body 1. The spiral grooves or indentation 15 aid in ensuring good adhesion between the terminal heads 11 and 12 and the electrodes 4 and 5 respectively. The cemented assembly as shown in FIG. 2 is then placed in an oven at a relatively low temperature for curing the epoxy cement in order to produce mechanically strong homogeneous bond between the electrodes 4 and 5 and the terminal heads 11 and 12 respectively.

In order to bring out more clearly the manufacturing process used in making the ceramic capacitors comprising this invention the following example is given. This example is in no way restrictive as to the application of the method comprising this invention but is merely to demonstrate more clearly the method comprising this invention in view of the foregoing.

9300 grams of titanium oxide ($TiO_2$), 350 grams of zirconium oxide ($ZrO_3$), 280 grams of zinc oxide (ZnO) and 70 grams of bentonite are thoroughly blended together. A small quantity of phenolic resin is added to act as the temporary binder. A ceramic body is then formed by using a cylinder with piston ends having central protrusions to form the recesses, as explained above. The capacitance may be varied by adjusting the web or center portion thickness which depends, then, on the amount of metallic oxides used and pressure applied in the forming operation.

The molded body is then baked for ten hours at a peak temperature of 2200° F. The first four hours are required to reach the peak temperature. For the next two hours the molded ceramic body is baked at the constant peak temperature of 2200° F. The last four hours are required for the molded body to slowly cool down to room temperature. The resultant baked ceramic body has the following dimensions:

| | Inches |
|---|---|
| Length of body | .180 |
| Diameter of recesses | .076 |
| Outside diameter | .156 |
| Depth of recesses | .075 |
| Thickness of web or central portion between the recesses | .030 |

Shrinkage, based on the ceramic body dimensions before firing, is approximately 15%.

The recesses 2 and 3 are thereafter coated with silver paste to form electrodes as fully described above. The ceramic body is heated first to a low temperature to expel any volatile thinners present in the past and thereafter heated to a temperature of 1200° F. for twenty minutes to melt the paste and form a homogeneous bond between the metallic silver forming the electrodes and the ceramic. Epoxy conductive cement is applied to the terminal heads which are then placed within the recesses 2 and 3. The assembled capacitor is then baked for one hour at a temperature of 350° F. to cure the cement and form a strong conductive bond between the terminal heads 11 and 12 and the electrodes 4 and 5 respectively.

The resultant capacitor has a capacitance of 6 $\mu\mu$f. and a temperature coefficient of $-750$ parts/$10^6$/deg. C. This capacitor has a Q-value at 1.0 mc. of approximately 1500.

The embodiment shown in the drawings and described above is given merely for the purposes of explanation and illustration without intending to limit the scope of the claims to the specific details disclosed. It should be understood that the description of the preferred forms of the invention are for the purpose of complying with Section 112, Title 35 of the U.S. Code and that the claims should be construed as broadly as prior art will permit.

I claim:

1. A method for manufacturing cylindrical ceramic capacitors which consists of the steps of mixing ceramic powder granules with a temporary binder, molding the mixture to form a cylindrical ceramic body having an axial aligned recess in each end thereof, baking the ceramic body to vitrify the same, coating each recess with a silver paste to form electrodes, baking the ceramic coated body to fuse the coating and produce homogeneous electrodes bonded on the ceramic body, forming a solid cylindrical terminal head with a spiral groove along the terminal head perimetral surface by upsetting under compression one end of a terminal wire, applying a thermosetting conductive cement between the terminal head and electrode in each recess, and curing the cement by baking the assembled capacitor to form a bond between each electrode in each respective terminal head.

References Cited

UNITED STATES PATENTS

| 2,527,373 | 10/1950 | Parson | 317—242 |
| 3,052,573 | 9/1962 | Dumesnil | 29—420.5 |
| 3,221,387 | 11/1965 | Weller et al. | 29—25.42 |
| 3,274,467 | 10/1966 | Graf | 317—258 |

FOREIGN PATENTS 867,929  2/1953  Germany.

JOHN F. CAMPBELL, *Primary Examiner.*

RICHARD B. LAZARUS, *Assistant Examiner.*